June 8, 1954 J. L. FRANKLIN 2,680,785

SOUND HEAD MOUNTING

Filed Feb. 8, 1952 2 Sheets-Sheet 1

INVENTOR

John L. Franklin

BY Jewett, Mead, Browne & Schuyler

ATTORNEYS

INVENTOR
John L. Franklin

BY Jewett, Mead, Browne & Schuyler
ATTORNEYS

Patented June 8, 1954

2,680,785

UNITED STATES PATENT OFFICE 2,680,785

SOUND HEAD MOUNTING

John L. Franklin, Atlanta, Ga.

Application February 8, 1952, Serial No. 270,711

13 Claims. (Cl. 179—100.2)

The invention relates to a sound head mounting and more particularly to a mounting for supporting a magnetic sound head with respect to a magnetic sound record.

The present invention is concerned with the problem of decreasing wear of both the magnetic sound head and the magnetic sound record. Obviously, if such wear is decreased, the life of the magnetic head and the recording medium may be greatly increased and it will not be necessary to make as frequent replacement of these parts as is usually required.

I have found that if the poles of the magnetic sound head are held slightly out of contact; for example, a space of 1/20 of a mil, with the surface of the magnetic sound record, there is very little degradation of quality of sound during sound reproduction. Of course, this necessitates that the sound record surface be accurately sized but, as will be appreciated by those skilled in the art, such sizing can be accomplished. During the sound recording cycle of the magnetic transcription machine in which my invention is embodied, the poles of the magnetic sound head are brought into contact with the sound record surface to make the recording. The decrease in wear between these parts is thus accomplished by spacing them slightly during the reproduction cycle.

It is therefore an object of the present invention to provide a sound head mounting for supporting a sound head in slightly spaced relation to a sound record during sound reproduction and including means to move the sound head into contact with the sound record during sound recording.

Other objects of the present invention are to provide a mounting particularly adapted for use in a magnetic transcription machine and wherein the circuits include means to automatically cause the sound head to be in contact with the sound record when the circuits are shifted from sound reproducing to sound recording condition.

Briefly described, in a preferred embodiment of my invention, a magnetic sound head having magnetic poles is attached to a cantilever type arm, the latter being supported in generally tangential relation to the cylindrical surface of a cylinder type sound record so that the magnetic poles may be brought into contact with the sound record surface. The cantilever type arm is pivotally mounted, adjacent one end, on a support shaft. A roller is positioned adjacent the free end of the cantilever arm and is attached thereto by suitable shafting so that the roller can ride on the surface of the sound record and maintain the poles of the sound head slightly out of contact with the surface of the sound record during sound reproduction.

In one form of my invention, the connections between the roller and cantilever arm are essentially rigid. Such a type of connection will be employed when the sound record material is compressible enough to allow the roller to be pressed into it. Thus, an electromagnetically actuated arm is provided to press the roller down into the sound record and bring the poles of the sound head into contact with the sound record surface during recording. The circuitry employed is such that this electromagnet is energized simultaneously with energization of the sound recording circuit and is de-energized when the circuit connections are shifted from sound recording to sound reproduction.

In an alternative form of my invention the free end of the cantilever type arm is shiftable with respect to the roller mounting so that the free end may be depressed to bring the poles of the sound head into contact with the sound record surface even though the roller itself is not pressed into this surface. This particular form of the invention is used where the sound record material is too hard to be compressed enough to allow the roller to sink in a sufficient distance to bring the poles into contact with the record surface.

Other objects and advantages of my invention will become more apparent from the following detailed description taken in conjunction with the attached drawings wherein.

Figures 1, 2, 4:
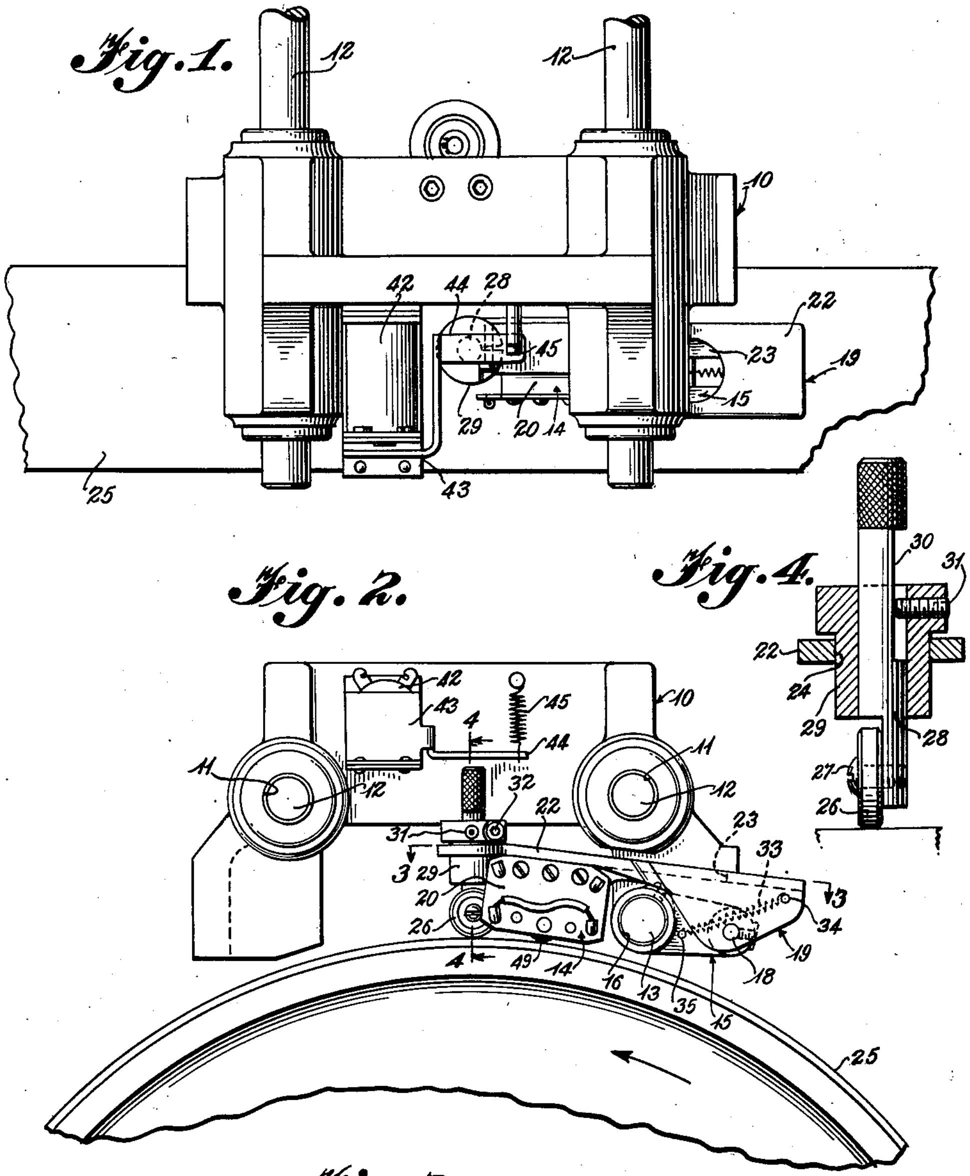
Fig. 1 is a plan view.
Fig. 2 is a side elevation.
Fig. 4 is a detail vertical section on line 4—4 of Fig. 2.

As I have stated, a preferred embodiment of the invention is one wherein a magnetic sound head is supported in relation to a magnetic sound record, these being parts of a magnetic transcription machine. Thus, referring to Figs. 1 and 2, the mounting for the magnetic sound head includes a block 10 having parallel bores 11 therein through which extend rods 12 which support the block 10. A stub shaft 13 projects laterally from block 10 and provides support for the magnetic sound head assembly which is indicated generally by the reference numeral 14.

As a part of the support for the assembly 14 with respect to stub shaft 13, another block 15 extends radially from shaft 13 and is journaled, as indicated at 16, to shaft 13 so that the block 15 may be adjusted circumferentially about shaft 13. In order to hold the block 15 in a particular position with respect to shaft 13, a set screw is provided which engages in an opening 17, shown in Fig. 3.

Figure 3:
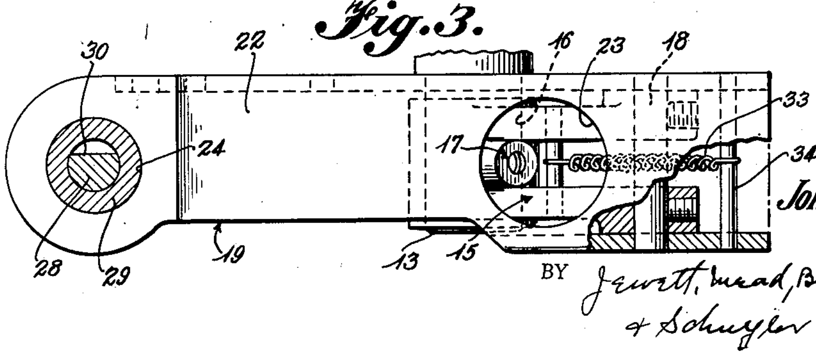
Fig. 3 is a detail plan view upon an enlarged scale of the head support but omitting the head.
Figure 5:
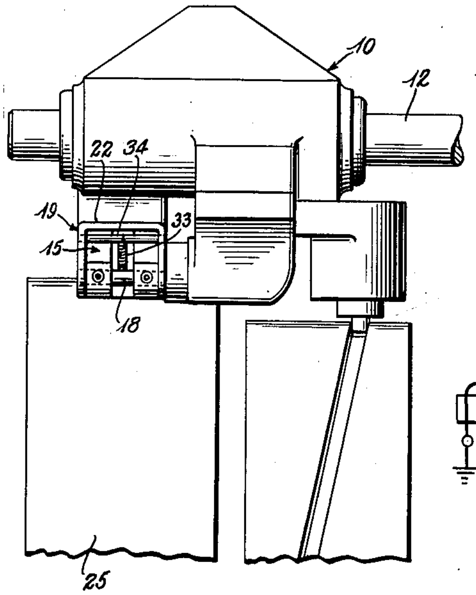
Fig. 5 is an end view of the structure of Figs. 1 and 2.

The member to which the magnetic sound head is attached is a channel member 19 which is pivotally mounted on a shaft or pin 18, the latter being supported by block 15 as shown more particularly in Figs. 3 and 5. By virtue of this connection of the channel member with respect to block 15, the channel member 19 is a cantilever type arm or carriage which is "fixed" adjacent one end by being pivotally connected to pin 18 and which is "free" at the opposite end. The magnetic sound head 20 is attached by screws 21 to arm 19. This arm 19 has a web portion 22 and this latter portion includes an opening 23 through which access is had to the set screw located in socket 17. Web 22 also has an opening 24 located adjacent the free end of arm 19.

In order to maintain the sound head 20 in slightly spaced relation; for example, about $\frac{1}{20}$ of a mil, with respect to the sound record surface 25 during sound reproduction, a roller 26 is mounted for rotation on a journal screw 27 which is located at the flattened end of a rod 28. Rod 28 is adjustably secured by a split bushing 29 which is mounted in opening 24 of the web 22 of cantilever type arm 19. Thus, the roller 26 is connected to arm 19 adjacent the free end of this arm. In order to maintain proper alignment of roller 26 with respect to record surface 25, rod 28 has a second flat surface 30 engaged by set screw 31.

With the arrangement just described, spacing of the sound head 20 relative to record surface 25 is achieved by loosening set screw 31 and clamp screw 32, the latter engaging split bushing 29, and then sliding rod 28 with respect to bushing 29 until the desired spacing of the sound head with respect to the record surface is obtained. Of course, screws 31 and 32 are retightened after the desired adjustment has been made. While the spacing is referred to broadly as a spacing between sound head 20 and record surface 25, it is actually a spacing between the sound head poles 49 and the record surface 25. As mentioned above, this spacing will be in the neighborhood of $\frac{1}{20}$ of a mil and thus is a slight spacing.

Roller 26 is maintained against record surface 25 not only by the weight of the parts but also by the bias imparted to arm 19 by tension spring 33. Thus, referring to Figs. 2 and 3, the tension spring 33 is anchored at one end to a pin 34, and at its other end to a pin 35. Since pin 34 is carried by arm 19 and pin 35 is carried by block 15, spring 33 acts to urge the free end of arm 19 toward record surface 25 inasmuch as the spring is located to one side of pivot pin 18 as shown in Fig. 2.

Figure 6:
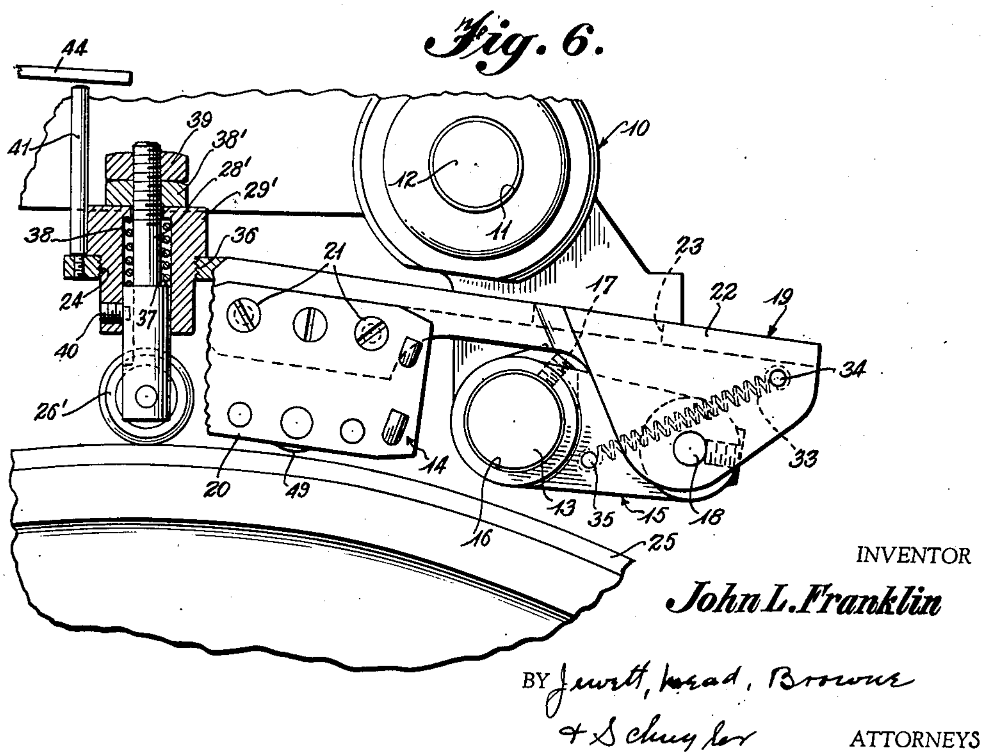
Fig. 6 is a detail side elevation similar to Fig. 2 but to an enlarged scale and partly broken away to show the embodiment of the invention for use on non-resilient recording material.

An alternative form of mounting the roller 26 with respect to record surface 25 is shown in Fig. 6 of the drawings. In this figure, the roller is indicated at 26' and is rotatably mounted at one end of rod 28', the latter extending through bushing 29'. In this particular embodiment of my invention, bushing 29' is firmly secured to the free end of cantilever type arm 19 by the screw thread connection indicated at 36.

Rod 28' has a shoulder 37 against which is seated a compression spring 38 located in a bore in bushing 29', the upper end of spring 38 abutting against the upper part of bushing 29' as shown in Fig. 6. Thus, spring 38 tends to urge bushing 29' upward with respect to rod 28' and, since bushing 29' is screw-threaded to the free end of cantilever type arm 19, the spring also tends to urge the free end of arm 19 upward with respect to rod 28' and, of course, upward with respect to roller 26'.

To adjust the position of rod 28' relative to bushing 29', nuts 38' and 39 are provided. By loosening nut 39, which is a lock nut, nut 38' can then be rotated to make the desired adjustment. When lock nut 39 is again tightened the adjusted position will be maintained. Screw 40 has one end projecting into a groove in rod 28' as shown in Fig. 6 and maintains roller 26' in the proper direction relative to record surface 25. A pin 41 extends upward from the free end of cantilever type arm 19 as shown in Fig. 6, and the purpose of this pin 41 is described later in this specification.

From the foregoing description, it is apparent that the respective rollers 26 and 26' can maintain the sound head 20, and more particularly the magnetic poles 49, slightly spaced from record surface 25. As stated, this spacing is maintained during sound reproduction or play-back from the sound record 25. When it is desired to make a record on sound record 25, the magnetic poles 49 are brought into actual contact with the surface of the sound record.

In a preferred form of my invention, this is accomplished by an electromagnet 42 having an armature 43 which carries a finger 44. In the form of my invention illustrated in Fig. 2 of the drawings, this finger 44 overlies the upper end of rod 28 and it is obvious that if the finger 44 moves down it will tend to press roller 26 into the surface of sound record 25. Where the sound record surface is a body of resiliently compressible material having magnetic particles embedded in its mass, it is possible for roller 26 to actually sink into the record surface enough to bring poles 49 into actual contact with the record surface 25. Accordingly, the form of my invention shown in Fig. 2, insofar as the connection of roller 26 with respect to the free end of cantilever type arm 19 is concerned, is adapted to be used where the sound record surface is resiliently compressible. In order to return finger 44 to its normal position when electromagnet 42 is de-energized, a tension spring 45 is attached to the free end of finger 44.

The form of my invention shown in Fig. 6 is adapted for use with a sound record wherein the record surface 25 is too hard to permit roller 26' to be forced into the surface enough to bring magnetic poles 49 into actual contact with the record surface. By virtue of the arrangement shown in Fig. 6, when finger 44 moves down against pin 41 this forces bushing 29', and consequently the free end of cantilever arm 19, downward with respect to the roller supporting rod 28'. This action, occurring against the force exerted by spring 38, causes the sound head 20 to move relative to roller 26' enough to bring magnetic poles 49 into contact with the surface of sound record 25. When electromagnet 42 is de-energized, spring 38 forces the free end of cantilever type arm 19 up again and consequently moves sound head 20 back to the position wherein magnetic poles 49 are slightly spaced from the surface of sound record 25.

Figure 7:
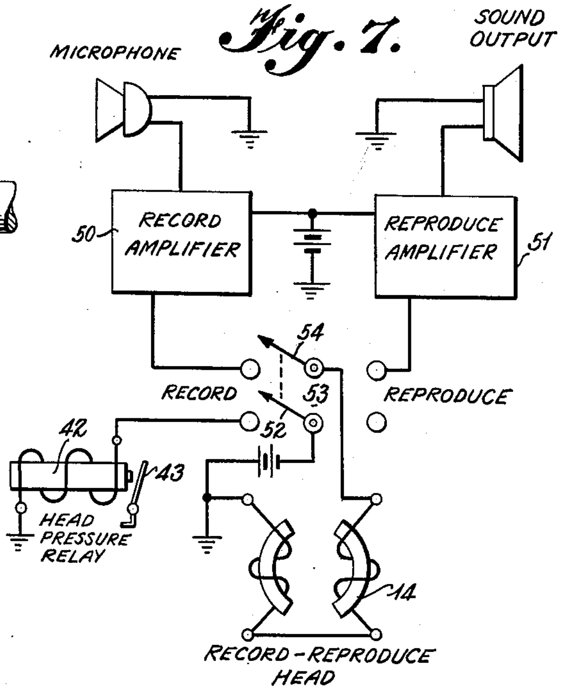
Fig. 7 is a diagram of circuits.

From the above description, it is apparent that electromagnet 42 should be energized substantially simultaneously with the start of sound recording and should be de-energized during sound reproduction. A preferred circuit arrangement for accomplishing this is illustrated in Fig. 7. Referring to this figure, the magnetic sound recording and reproducing head is indicated at 14, a record amplifier with associated microphone is indicated at 50, and a reproduce amplifier with associated loud speaker is indicated at 51. Electromagnet 42 is shown as being in a circuit which includes one blade 52 of a double-pole double-throw switch 53. The other blade 54 of switch 53 connects the record reproduce head 14 alternatively to either the record amplifier circuit or the reproduce amplifier circuit.

The switch blade arrangement is such that when blade 54 connects the sound head to the record amplifier circuit, blade 52 substantially simultaneously causes electromagnet 42 to be energized, as will be obvious from viewing Fig. 7. When switch 53 is thrown to its other position, electromagnet 42 is de-energized and the sound head is connected to the reproduce amplifier circuit.

It will thus be seen that I provide a sound head mounting arrangement and associated circuit connections which will enable the magnetic poles of a magnetic sound head to be maintained slightly out of contact with the sound record surface during sound reproduction but permits these poles to be brought into actual contact with the sound record surface during sound recording. As previously stated, this mounting arrangement decreases the sound head and sound record wear which normally occurs in this type of equipment and thus increases the useful life of these parts. Furthermore, despite the fact that the magnetic poles are actually out of contact with the record surface during sound reproduction, the quality of sound output is still adequate.

While I have described and illustrated preferred embodiments of my invention, I wish it to be understood that I do not intend to be restricted solely thereto but that I do intend to cover all modifications thereof which would be apparent to one skilled in the art and which come within the spirit and scope of my invention.

I claim:

1. A magnetic sound head mounting for supporting the poles of the sound head in slightly spaced relation to a sound record during sound reproduction while permitting said poles to be brought into contact with said sound record during sound recording, said mounting comprising a sound head having magnetic poles, resiliently yieldable spacing means having rolling contact with a sound record while in use therewith acting to hold said poles slightly spaced from the record during sound reproduction, and means acting to compress the spacing means to bring said poles into contact with the sound record during sound recording.

2. A sound head mounting for supporting a sound head in slightly spaced relation to a sound record during sound reproduction while permitting said sound head to be brought into contact with said sound record during sound recording, said mounting comprising a support member, a cantilever arm connected adjacent one end to said support member, a sound head supported by said cantilever arm, means connected to said cantilever arm adjacent the free end thereof, said last-named means being adapted to maintain said sound head in slightly spaced relation to a sound record during sound reproduction, and means to press said sound head into contact with a sound record during sound recording.

3. A sound head mounting for supporting a sound head in slightly spaced relation to a sound record during sound reproduction while permitting said sound head to be brought into contact with said sound record during sound recording, said mounting comprising a support shaft, a cantilever arm pivotally connected to said support shaft adjacent one end of said arm, a roller connected to said cantilever arm adjacent the free end thereof, a sound head connected to said cantilever arm between the ends of the arm, said roller being constructed and arranged to ride upon the surface of a sound record and maintain the sound head in slightly spaced relation with respect to said sound record during sound reproduction, and means to press said sound head into contact with said sound record during sound recording.

4. The combination of claim 3 wherein said pressing means includes an electromagnet having an arm adapted to press the sound head into contact with the sound record during sound recording.

5. A magnetic sound head mounting for supporting the poles of a magnetic sound head in slightly spaced relation to the surface of a cylindrical sound record during sound reproduction while permitting said poles to be brought into contact with said surface during sound recording, said mounting comprising a cantilever arm positioned in substantially tangential relation to the cylindrical surface of a magnetic sound record, a magnetic sound head connected to said cantilever arm in position such that the poles of the sound head may be brought into contact with the surface of the sound record, a roller connected to said cantilever arm adjacent the free end thereof, said roller being constructed and arranged to ride upon the cylindrical surface of the sound record and maintain the poles of the magnetic sound head slightly spaced from the surface of said sound record during sound reproduction, and means to press said roller into said sound record to bring the poles of the sound head into contact with the surface of said record during sound recording.

6. A magnetic sound head mounting for supporting the poles of a magnetic sound head in slightly spaced relation to the surface of a cylindrical sound record during sound reproduction while permitting said poles to be brought into contact with said surface during sound recording, said mounting comprising a cantilever arm positioned in substantially tangential relation to the cylindrical surface of a magnetic sound record, a magnetic sound head connected to said cantilever arm in position such that the poles of the sound head may be brought into contact with the surface of the sound record, a roller connected to said cantilever arm adjacent the free end thereof, said roller being constructed and arranged to ride upon the cylindrical surface of the sound record and maintain the poles of the magnetic sound head slightly spaced from the surface of said sound record during sound reproduction, the free end of said cantilever arm being shiftable with respect to said roller, and means to shift said free end to bring the poles of the magnetic sound head into contact with the surface of the sound record during sound recording.

7. A magnetic sound head mounting for supporting the poles of the sound head in slightly spaced relation to a sound record during sound reproduction while permitting said poles to be brought into contact with said sound record during sound recording, said mounting comprising a supporting block formed with a mounting shaft, an arm extending radially from said shaft and being pivotally connected thereto whereby said arm may be adjusted circumferentially about said mounting shaft, a head carriage pivotally mounted on said arm on an axis spaced from the axis of said mounting shaft, a magnetic sound head mounted on said carriage, and a sound record contacting roller also mounted on said carriage to hold said magnetic sound head spaced from a sound record during sound reproduction.

8. The combination of claim 7 with resilient means adapted to press said roller against a sound record.

9. The combination of claim 7 with an electromagnet acting, during sound recording by said magnetic sound head, to press the poles of the sound head into contact with a sound record.

10. A magnetic sound head mounting for supporting the poles of a magnetic sound head slightly spaced from the surface of a cylindrical magnetic sound record during sound reproduction while permitting said poles to be brought into contact with the surface of the sound record during sound recording, said mounting comprising a support shaft, a cantilever arm pivotally connected to said support shaft adjacent one end of the arm and extending in generally tangential relation to the cylindrical surface of a sound record, a magnetic sound head connected to said cantilever arm, a roller positioned adjacent the free end of said cantilever arm, said roller being mounted on a shaft and said shaft extending through an opening in the free end of said cantilever arm, a spring interposed between said roller shaft and the free end of said cantilever arm, said spring normally urging said free end away from the roller and the roller and spring being constructed and arranged to maintain the poles of the magnetic sound head slightly spaced from the surface of a sound record during sound reproduction, and means to depress the free end of said cantilever arm against the action of said spring to bring the poles of the magnetic sound head into contact with the surface of a sound record during sound recording.

11. A circuit for use with a magnetic sound head and sound record assembly wherein the poles of the sound head are maintained slightly spaced from the surface of the sound record during sound reproduction but are brought into contact with said surface during sound recording, said circuit comprising a sound reproducing circuit for said sound head, a sound recording circuit for said sound head, a circuit including an electromagnet adapted to depress the sound head into contact with the sound record during sound recording, and means to energize said last-named circuit substantially simultaneously with and only when said sound recording circuit is energized.

12. A circuit for use with a magnetic sound head and sound record assembly wherein the poles of the sound head are maintained slightly spaced from the surface of the sound record during sound reproduction but are brought into contact with said surface during sound recording, said circuit comprising a sound reproducing circuit for said sound head, a sound recording circuit for said sound head, a circuit including an electromagnet adapted to depress the sound head into contact with the sound record during sound recording, and a two-position switch means controlling said sound reproduction circuit in one position and controlling both said sound recording circuit and the circuit including the electromagnet in the other position.

13. The combination of claim 12 wherein said switch means is a double-pole, double-throw switch having one blade which controls the sound reproduction circuit and the sound recording circuit and another blade which controls the circuit including the electromagnet.

References Cited in the file of this patent

UNITED STATES PATENTS

| Number | Name | Date |
|---|---|---|
| 2,144,844 | Hickman | Jan. 24, 1939 |
| 2,328,539 | Greenleaf | Sept. 7, 1943 |